Sept. 2, 1941.  A. RIGHI  2,254,242

INDICATING MEASURING APPARATUS

Filed May 7, 1938  2 Sheets-Sheet 1

WITNESSES:
Wm. B. Sellers.
C. L. Freedman

INVENTOR
Aldo Righi.
BY
ATTORNEY

Sept. 2, 1941.   A. RIGHI   2,254,242
INDICATING MEASURING APPARATUS
Filed May 7, 1938   2 Sheets-Sheet 2

WITNESSES:
Wm. B. Sellers
C. L. Freedman

INVENTOR
Aldo Righi.
BY
ATTORNEY

Patented Sept. 2, 1941

2,254,242

UNITED STATES PATENT OFFICE 2,254,242

INDICATING MEASURING APPARATUS

Aldo Righi, Bologna, Italy

Application May 7, 1938, Serial No. 206,692
In Italy May 10, 1937

6 Claims. (Cl. 116—129)

Different shapes are often given to indicating measuring apparatus not only for esthetic purposes, but also to render the value indicated by the apparatus more evident. Sometimes the normal value of the variable quantity measured by the apparatus is indicated, for instance by a red line marked in a point of the graduated scale; such an indication of normal value is normally found in the apparatus measuring a quantity generally slightly variable, for instance the voltmeters on constant potential distribution nets. Also in apparatus measuring largely variable quantities, as for instance ammeters in the case of constant potential distribution it is interesting that the value of the quantity measured be, at least approximately, evident at the first glance, the visibility of the position of the index with respect to the graduated scale being suitably enhanced.

This is obtained, according to the invention, in different ways; for instance by dividing the total angular amplitude of deviation of the index into two or more parts equal or not to each other and tracing the graduation on circles having the radius growing together with the value indicated so that the index should move firstly along the portion of graduated scale having a less radius, then along the second portion having a greater radius, and so on.

The invention will be described with reference to certain specific embodiments illustrated on the accompanying drawings in which.

Figure 8:
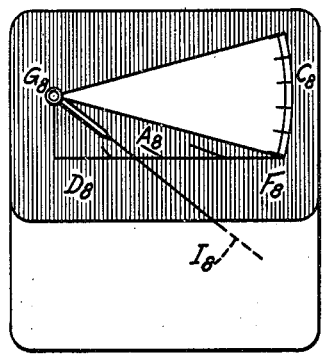
Figure 12:
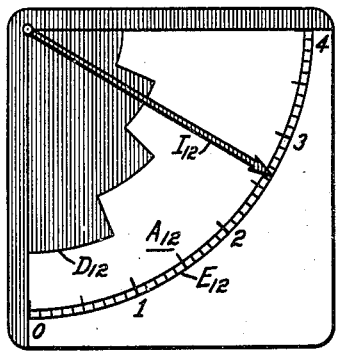
Figure 9:
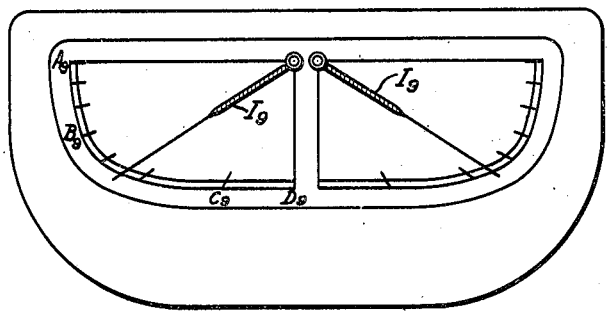
Figure 10:
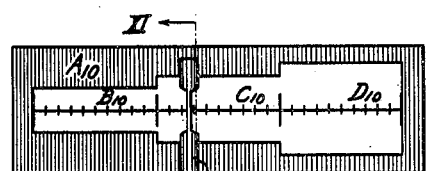
Figure 11:
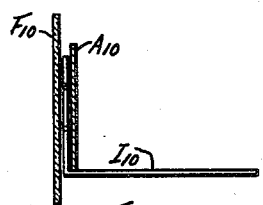
Figure 13:
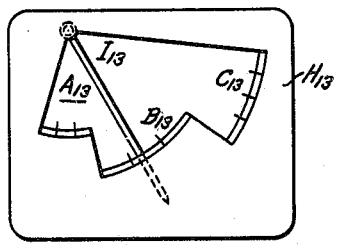

Figs. 8, 9, and 10 are views in front elevation of electrical measuring instruments illustrating further modifications of the invention;

Fig. 11 is a detail view in cross-section illustrating further the relationship of the parts shown in Fig. 10; and Figs. 12 and 13 are views in front elevation of measuring instruments embodying still further modifications of the invention.

Figure 1:
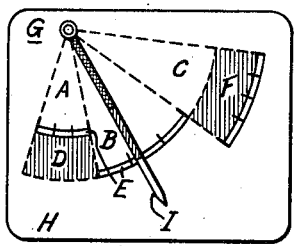
Figures 1 to 5 are views in front elevation of various measuring instruments embodying the invention.

Fig. 1 represents an indicating apparatus G whereof the scale E is subdivided into three portions corresponding to the division into three sectors A, B, C of the maximum deviation angle of the index I. The apparatus G has the index differently coloured, or with three different graduations of colour in the portion corresponding to the radius of the first sector, the successive portion to equal the radius of the second sector, and so on.

The different colours, or tones are in relation to the colours or tones of the different sectors, so that when the index is within the first sector, only the first portion thereof be visible and not the other two, and when the index is within the second sector the first two portions be visible and the third be invisible, and when finally the index is within the third sector it be all visible.

In the drawings resort has been had to white, black and grey, the latter being represented in the figures by hatching. In the first sector the part A is white, whilst the part D is grey; the second sector B is all white; in the third sector C only the annular zone F is grey. The index I is black in the first portion, grey in the second portion and white in the third portion.

The observer can thus see at the first glance whether the index is in the first third of the scale, or in the central part, or in the last, assisted in this approximate estimation of the value of the quantity measured by the fact that the index will appear of different length.

Of course in the case described, as well as in all the other following cases it is possible to adopt simple plates with perforations of different sizes, wherethrough only the portion of index to be left visible, in correspondence to the different zones of the range of measures could show. This disposition would present, however, some evident practical drawback.

Figure 2:
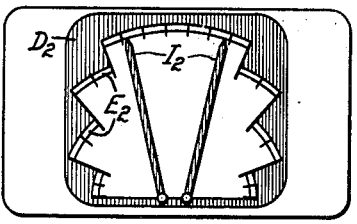

Fig. 2 represents two ammeters coupled and contained inside the same casing, the scale $E_2$ of each of same being subdivided into four sectors. Such a disposition has the advantage of showing at the first glance the possible unbalancing of the two currents measured by the duplex apparatus which finds its employment especially in the controlling panels of three-phase high potential lines.

Both indexes $I_2$ of the ammeters are black, and the background $D_2$ beyond the graduations of the scale $E_2$ also is black. The casing, which can be hidden behind the panel whereon the apparatus is applied has a size sufficient to contain the indexes also when in horizontal position and only partially visible.

Such a disposition of the scale and index is particularly suitable for the measure of quantities which can undergo sudden and considerable variation. When, instead, quantities normally slightly variable are to be measured, it is sufficient to divide the scale into two sectors only having different radii.

For instance, a voltmeter connected on a distribution net of constant potential must indicate exactly a variation of 20 per cent at most with respect to the normal value. It is interesting, however, to know, yet with less accuracy, values of the potential less than 80 per cent of the normal potential and to know also when the potential is null.

Figure 3:
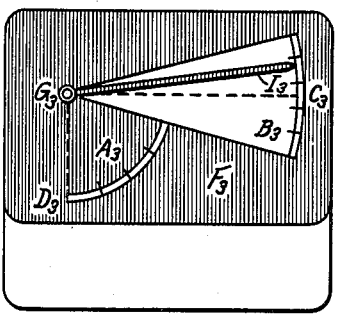

Fig. 3 represents a measuring apparatus $G_3$ and a dial $F_3$ whereof the scale is subdivided into two sectors $A_3$ and $B_3$ which are visible through the glass mounted on the frame. When the index $I_3$ (which will be suitably coloured so that when it is in the first sector only the first portion of the same index is visible and when in the second sector it is all visible) is in vertical position $G_3$ $D_3$ the potential indicated by the apparatus is zero, when in horizontal position $G_3$ $C_3$ the potential has its normal value. In the example all the dial is grey (etching) except the sector B corresponding to the values which is interesting to measure with accuracy, which is white in the example, and the approximately horizontal position of the index corresponds to the normal value of potential. The same apparatus, rotated by 90° will give analogous indications based on the valuation of the vertical position on the index. Thus the horizontal and vertical position of a line are immediately and surely perceived by anybody; as well as the slope in one sense or the other, that is the deviation from the position corresponding to the normal value of the quantity measured is at the first glance appreciable in its approximate value. Another application of the invention is the following: instead of giving only the appearance of indexes of different length to the single index of the apparatus by suitably colouring the latter, a second index may be mounted independently from the measuring apparatus, said second index being also provided with a return bias capable of bringing back the same to a resting position different from that of the first index of the measuring apparatus.

Figure 4:
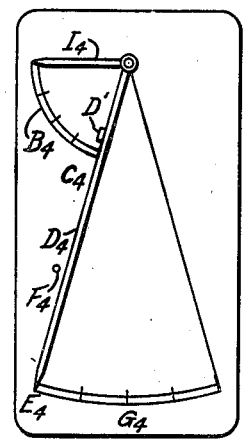

Fig. 4 represents an indicating apparatus whereof the index $I_4$ can move circularly along the graduated scale $B_4$ and also beyond the point $C_4$ where said scale ends.

$D_4$ represents another index, which we shall call auxiliary of much greater length, which, when it is in the resting position under the action of a return couple or bias, finds its place along the straight line $C_4$ $D_4$ $E_4$ against a stop $F_4$. $G_4$ indicates a graduated scale for the most interesting values to be determined with accuracy, the vertical position of the auxiliary index being, in the case of the example, that which corresponds to the normal value.

When the index $I_4$ has moved along the whole scale $B_4$ and has reached the position $C_4$, it goes to hide under the auxiliary index and by leaning against a tooth D' solid with the same, drags it together when the value to measure is greater than that corresponding to the position $C_4$ of the index. The colours of the indexes and dial being suitably selected, only the small index will be seen for values below the aforesaid value, and only the auxiliary index for the values above, the auxiliary index presenting a rightwards or leftwards deviation with respect to the vertical representing the normal value, well visible and estimable in its value also from far away. For simplicity of drawing the different colours of indexes and dials have not been indicated.

With the adoption of the auxiliary index the apparatus can always be given a rectangular shape with one side considerably different from the other, because the dimension of the shorter side affects the length of the main index only, whilst the dimension of the longer side controls that of the auxiliary index, if the center of rotation of the indexes is suitably located with respect to the casing containing the apparatus.

Of course, resort may be had to two or more auxiliary indexes instead of one only, said indexes starting successively when the value of the quantities measured exceeds the value corresponding to the resting position of the first auxiliary index, then of the second, and so on; and the mechanic dependence of the different indexes may be of other nature or differently realised.

Figure 5:
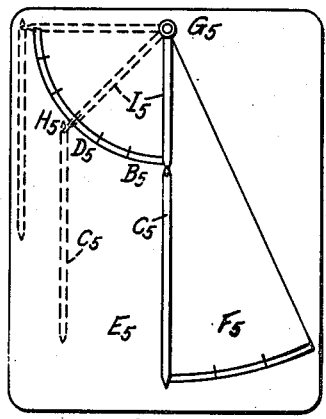
Figures 6, 7:
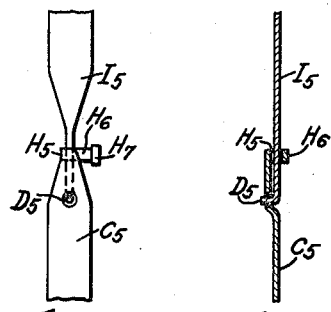
Fig. 6 is a detail view in front elevation of the pointer assembly employed for the measuring instrument of Fig. 5.
Fig. 7 is a view in side elevation of the structure shown in Fig. 6.

Another solution according to the invention is represented by Fig. 5. The index is so articulated that when it moves in the left sector, corresponding to the lower values of the variable quantity measured by the apparatus, only the portion $I_5$ of said index, solid with the rotating part of the apparatus $G_5$, is visible along the graduated scale $B_5$, whilst the articulated extension $C_5$ of the index, which extension takes a vertical position by gravity being pivoted on the index $I_5$ at $D_5$, is rendered invisible being of the same colour as the part $E_5$ of the dial. When the index moves in the right sector, it is visible for all its length $I_5+C_5$, the sector $F_5$ being painted with a tone of colour much different from that of the extension C of the index (the different colour is not indicated by the figure). The articulation at $D_5$ is so made that in the movements at the right of the vertical the parts $I_5$ and $C_5$ keep on a straight line. This is obviously and easily obtainable in different manners, for instance by providing the part $C_5$ with an appendix $H_5$ which bears againts the part $I_5$. Figs. 6 and 7 show a front view and a side view of said articulation. In Fig. 7 is indicated in section, for better clearness, the part of the index which constitutes the extension.

If, moreover, the appendix $H_5$ includes a small weight $H_7$ carried by an arm $H_6$ bent to the right, the extension $C_5$ of the index tilts towards the left, so that the solidarity of movement between the two parts $I_5$ and $C_5$ of the index occurs, instead of from the vertical, from an angle towards the left corresponding to the position of equilibrium taken by the part $C_5$ of the index under the action of the above weight.

In the foregoing examples of embodiments of the invention the scale consisted of several sectors with different radii, having the object of signaling from a distance, according to the position of the index, the approximate value of the quantity measured. Instead of arcs of circles for the various parts of the graduated scale, segments of straight lines or any curves not geometrically definable may be adopted.

Fig. 8 represents an apparatus similar to that indicated by Fig. 3, with the difference that the part of graduated scale which, representing the slightly variable quantity to be measured, has no other object than that of indicating approximately the value of the same quantity in case of abnormalities reducing the same to very low values, is rectilinear and horizontal instead of consisting of a sector of small radius. Suitably the index will filiform, or else it will show its edge, for the part moving along the two graduated scales. Except for their subscripts, the reference characters of Fig. 8 correspond to those of Fig. 3.

Fig. 9 represents two apparatus coupled with variable curvature graduated scales wherein, in correspondence to the higher values of the quantity measured, each index $I_9$ assumes a greater length; moreover, the curvature of such scale is so selected that the reading can be the more accurate, the nearer the index is to the position corresponding to the normal value. The scale may show values decreasing from a maximum value $A_9$ to $D_9$.

Fig. 10 represents a front view and Fig. 11 a diagrammatic section of an embodiment of the invention in the case of an apparatus of the so-called profile type. In the example the graduated scale is divided into three parts $B_{10}$, $C_{10}$, $D_{10}$ consisting of three bands of height increasing from left to right, if the smaller values of the quantity measured are at the left. Said bands along the axis whereof is traced the graduation, stand forth in a light colour on the dark background $A_{10}$. The index $I_{10}$, of the same colour as the background is shaped so as to allow an accurate reading when the observer is near to the apparatus and a ready reading of the approximate value when the observer is far, in correspondence to the numeration of the scale, which may be suitably written on a transparent plate not represented by Fig. 10 and indicated by $F_{10}$ in Fig. 11, the index moving between plate $F_{10}$ and scale $A_{10}$.

Fig. 10 may be taken as a diagrammatic representation of an embodiment of the invention in the case of a rectilinear scale, limit case when the radius of curvature of the scale is supposed to increase ad infinitum.

The examples of application of the invention illustrated above are only a few of the very numerous possible cases, which may be adapted to all the indicating instruments with index movable along a fixed graduated scale, or vice-versa, the nature of the quantity measured being any.

Fig. 12 represents another embodiment according to which the graduation $E_{12}$ of the dial $A_{12}$ is all disposed on an arc of a circle concentric with the axis of rotation of the index $I_{12}$, different portions of the index being rendered invisible in correspondence to successive concentric sectors having different radii. To this end an irregular portion $D_{12}$ of the dial bears the same color as the index $I_{12}$.

Fig. 13 discloses an instrument similar to that of Fig. 1 except for the provision of a mask or plate $H_{13}$ which is provided with window portions $A_{13}$, $B_{13}$, $C_{13}$. These window portions vary in length from the axis M about which an indicating member $I_{13}$ rotates. It will be observed that the indicating member extends beneath the plate $H_{13}$ and is masked thereby to an extent dependent upon the position of the indicating member.

What I claim is:

1. In a measuring instrument for indicating the value of a variable quantity, a dial, an indicating member, means mounting said indicating member for movement across a face of said dial in accordance with the quantity to be measured, and means for varying the apparent size of said indicating member as it moves in a single transit across the face of said dial.

2. In a measuring instrument having a single continuous scale comprising a first scale section and a second scale section adjacent said first scale section, a first indicating member, means mounting said first indicating member for movement only over said first scale section, a second indicating member, means mounting said second indicating member for movement over said second scale section and with substantial overtravel outside the space occupied by said second scale section, and means effective during the overtravel of said second indicating member for actuating said first indicating member over said first scale section.

3. In a measuring instrument, a first scale section, a first pointer, means mounting said first pointer for movement over said first scale section and for a substantial overtravel beyond said first scale section, a second pointer articulated to said first pointer, said pointers being designed to maintain substantial alignment in the range of said overtravel and to pivot about the point of articulation thereof when said first pointer moves over said first scale section, and a second scale section cooperating with said second pointer in said range of overtravel, said first and second scale sections comprising adjacent sections of a single continuous scale.

4. In a measuring instrument, a continuous scale, an indicating member, and means mounting said indicating member for rotation across said scale about an axis, the distance from said scale to said axis varying appreciably for different positions of said indicating member on said scale.

5. In an instrument for measuring a variable quantity, scale means presenting a scale having a first point corresponding to a predetermined value of said variable quantity and having a second point corresponding to a larger value of said variable quantity, an indicating member, means mounting said indicating member for movement relative to said scale means between said points in a single transit of said indicating member across said scale means, and obscuring means for increasing the apparent size of said indicating member as said indicating member moves from said first point to said second point in a single transit across said scale means, said obscuring means being effective to render substantially indiscernible a predetermined portion only of said indicating member only when said indicating member is adjacent said first point.

6. In an instrument for measuring a variable quantity, scale means presenting a scale having a first point corresponding to a predetermined value of said variable quantity and having a second point corresponding to a larger value of said variable quantity, an indicating member, means mounting said indicating member for rotation relative to said scale means between said points in a single transit of said indicating member across said scale means, and obscuring means for increasing the apparent size of said indicating member measured radially from the axis of rotation thereof as said indicating member moves from said first point to said second point in a single transit across said scale means, said obscuring means being effective to obscure a portion of said indicating member measured radially from the axis of rotation thereof when said indicating member is adjacent said first point and to render discernible said portion when said indicating member is adjacent said second point.

ALDO RIGHI.